Figure 1:
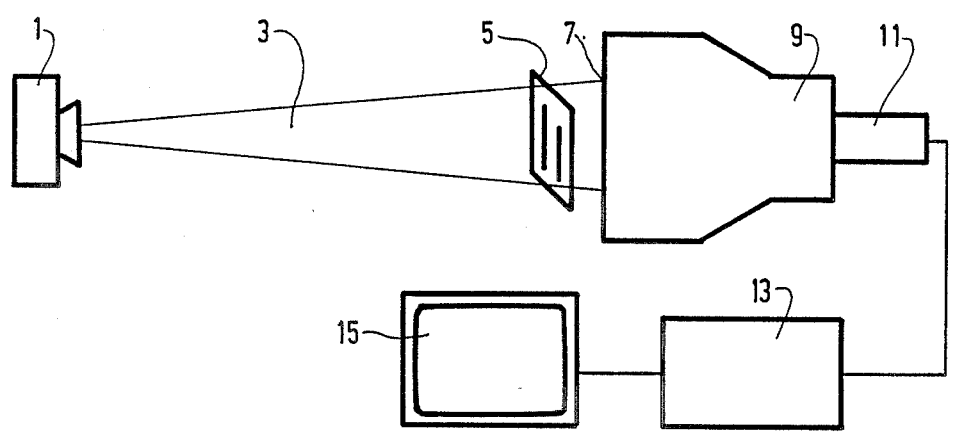

United States Patent [19]

Brok et al.

[11] Patent Number: 4,972,451

[45] Date of Patent: Nov. 20, 1990

[54] METHOD OF DETERMINING A MODULATION TRANSFER FUNCTION OF A DIGITAL IMAGING SYSTEM

[75] Inventors: Marius Brok; Cornelis Slump, both of Eindhoven, Netherlands

[73] Assignee: U.S. Philips Corporation, New York, N.Y.

[21] Appl. No.: 468,501

[22] Filed: Jan. 23, 1990

[30] Foreign Application Priority Data

Jan. 30, 1989 [NL] Netherlands ............ 8900217

[51] Int. Cl.$^5$ .................. G01D 1/14; H05G 1/02; H05G 1/64
[52] U.S. Cl. .................. 378/207; 378/210; 378/99
[58] Field of Search ............ 378/99, 98, 62, 160, 378/87, 204, 207; 382/41, 42, 50, 54, 69; 364/413.19, 413.20, 413.21

[56] References Cited

U.S. PATENT DOCUMENTS

| 4,241,996 | 12/1980 | Weiser | 356/124.5 |
| 4,792,900 | 12/1988 | Sones et al. | 382/54 |
| 4,817,181 | 3/1989 | Kamiya | 382/54 |
| 4,907,288 | 3/1990 | Shimoni | 382/54 |

OTHER PUBLICATIONS

R. A. Sones, "A Method to Measure the MTF of digital X-ray Systems", Medical Physics, vol. 11, No. 2, Mar.-/Apr. 1984, pp. 166-171.

*Primary Examiner*—Janice A. Howell
*Assistant Examiner*—Don Wong
*Attorney, Agent, or Firm*—William Squire

[57] ABSTRACT

The modulation transfer function of a digital imaging system is measured using a test object comprising a number of slits. The effect of geometrical distortions on the MTF measurement, is minimized by making the dimension of the test object as small as possible with respect to the image detector. The minimum slit spacing d enabling suitable MTF measurement is expressed in the number of pixels N over a dimension L of the image detector: $d > 8L/N$.

10 Claims, 2 Drawing Sheets

METHOD OF DETERMINING A MODULATION TRANSFER FUNCTION OF A DIGITAL IMAGING SYSTEM

The invention relates to a method of determining a modulation transfer function of a digital imaging system, comprising an image detector, where an image to be formed is composed of a number of N discrete pixels, a radiation intensity distribution spatially line-wise modulated by a test object being presented to an image detector entrance the imaging system into electric signals which are a measure of the radiation intensity distribution of the pixels, an arithmetic device determining from said signals a spectrum wherefrom the modulation transfer function is derived.

A method of this kind is known from an article by R. A. Sones, G. T. Barnes, "A method to measure the MTF of digital X-ray systems"; Med. Phys. 11(2), March/April, 1984.

This article describes how the modulation transfer function, referred to hereinafter as MTF for the sake of brevity, is determined in a digital imaging system such as a radiography or fluoroscopy system. The MTF of a system is an objective measure of the imaging quality of an imaging system. In the absence of geometrical distortion, an imaging system will reproduce a sinusoidal intensity distribution on a detector entrance face as a sinusoidal intensity distribution whose contrast has been reduced and whose phase has been shifted with respect to the original intensity distribution. By dividing the ratio of the contrast in the displayed intensity distribution by the contrast of the intensity distribution on the entrance face of the detector, the MTF of the detector can be measured for different spatial frequencies. For a spatial frequency zero, the MTF amounts to 1 and decreases to Zero as the frequency increases.

A more effective method of measuring the MTF of an imaging system is based on the fact that the MTF can be described as the modulus of the one-dimensional Fourier-transform of the line spread function of the imaging system. The line spread function describes the image of a line displayed by the detector on the detector entrance face. For example in digital detectors whose detector entrance face is, for example subdivided into a matrix of separate detection sub-faces a problem is encountered in the determination of the MTF from the Fourier transform of the line spread function in that aliasing occurs because the sampling frequency is too low. Aliasing is the occurrence of components of the spectrum of the image displayed at frequencies which are lower than the frequencies with which the spectrum components are actually associated. This is because the spectrum of a sampled signal in the frequency domain is a periodic version of the actual spectrum. When these periodic spectra overlap, reconstruction of the original spectrum is not possible. By constructing the test object as a number of parallel slits, the problem imposed by aliasing is mitigated and the MTF can be determined by Fourier transformation of the detector signals which are proportional to the image to be displayed.

The accuracy of the MTF measurements is limited by the occurrence of geometrical distortions of the image detector, for example cushion-shaped distortion. In order to minimize the effect of the distortions on the MTF measurements, it is necessary to use a test object which is as small as possible with respect to the detector entrance face. It is a drawback of the known test object that it is comparatively large and that effects of the distortion influence the accuracy of the MTF measurements.

It is the object of the invention to provide a method where the effect of the geometrical distortion on the accuracy of the MTF measurement is comparatively small.

To achieve this, a method in accordance with the invention is characterized in that a radiation-absorbing plate provided with substantially parallel equidistant slits is used as the test object, the slit spacing being at least 8 L/N.

By minimizing the slit spacing, the dimension of the test object can be reduced, but the distance in frequency of peaks in the spectrum increases. The optimum slit spacing is a compromise between these two effects. Moreover, the peak width of the peaks occurring in the spectrum implies that the number of slits must be large enough for discrimination of the individual peaks. Calculations have shown that accurate MTF measurements can be performed in an X-ray imaging system when use is made of a test object having a number of slits equal to 5 and a slit spacing amounting to 5 mm.

A version of a method of determining a modulation transfer function in accordance with the invention is characterized in that from an image of the test object formed by the image detector a geometrical distortion caused by the image detector is determined after which a distortion-dependent reliability value is derived for the measured modulation transfer function, which reliability value is found by calculating the transmission of a test object with a varying slit spacing.

Because the geometrical distortion of the imaging system can be measured with the aid of the test object, the accuracy of the MTF measurement can be determined for the given distortion.

A further version of a method of determining a modulation transfer function in accordance with the invention is characterized in that the envelope is determined by interconnecting discrete points by way of a Gaussian curve.

The Gaussian curve provides an accurate mathematical description of the MTF.

Figure 2A:
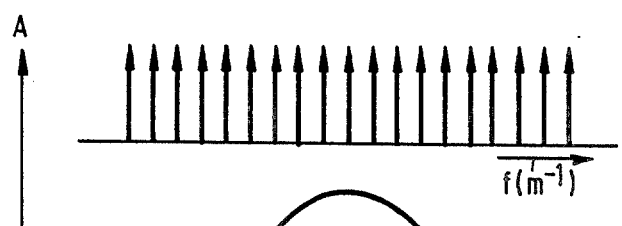
Figure 2B:
Figure 2C:
Figure 2D:
Figure 3:
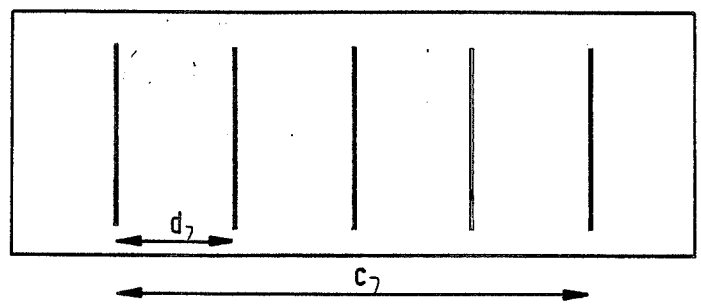
Figure 4:
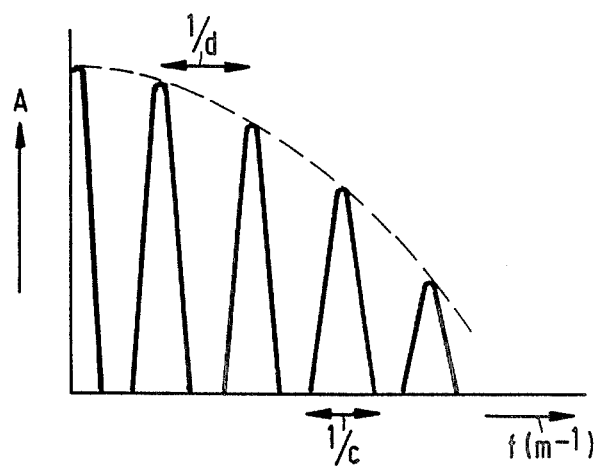
Figure 5:
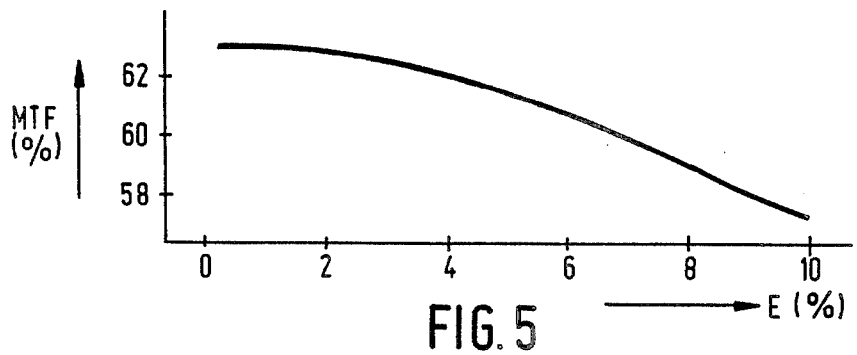

The foregoing will be illustrated with reference to the accompanying drawing. Therein:

FIG. 1 diagrammatically shows an X-ray imaging system,

FIGS. 2a, 2b, 2c and 2d illustrate the sampling of a line-shaped image by a discrete detector array, FIG. 3 diagrammatically shows the test object in accordance with the invention, FIG. 4 illustrates the sampling of a line shaped image, having a finite dimension, by a discrete detector array, and FIG. 5 shows a graph illustrating the variation of the measured MTF values for a varying geometrical distortion.

FIG. 1 shows an X-ray source 1 which irradiates a test object 5 by means of an X-ray beam 3. The entrance screen 7 of an X-ray image intensifier tube 9 receives a radiation intensity distribution which has been spatially line-wise modulated by the test object 5. The radiation intensity distribution is displayed on a television monitor 15 by means of a television camera tube 11, via an arithmetic device 13.

FIG. 2a shows the spectrum of a test object consisting of line-shaped slits. An amplitude A is plotted as a function of the frequency f. FIG. 2b shows the MTF of the imaging system, for example a combination of an X-ray image intensifier tube and a television camera tube. When the slit-shaped test object is displayed by the imaging system, in the frequency domain/the spectrum is multiplied by the MTF of the imaging system. The sampling operation is represented in the frequency domain by the convolution of the pulse train modulated by the MTF with a sampling pulse train as shown in FIG. 2c. As a result of this convolution, the pulse train modulated with the MTF becomes periodic with the sampling frequency $f_s$. Even when the condition: $f_s \geq 2f_m$, where $f_m$ is the maximum frequency in the MTF, is not satisfied, the MTF can still be reconstructed from the correct values of the envelope of the spectrum as shown in FIG. 2d.

The MTF is the discrete Fourier transform of the line spread function LSF(x) sampled by the discrete detector with a period $\Delta x$:

$$MTF(f) = DFT\{LSF(x).comb(k\Delta x)\} \quad (1)$$

Therein, comb($k\Delta x$) is the pulse train having the period $\Delta x$, k is a natural number, and the operator DFT denotes the discrete Fourier transform. The spatial dimensions of the test object are represented as LSF(x) convoluted with a pulse train comb(x/d) which introduces spatial periodicity d, and multiplied by a rectangular function rect(x/c) Which introduces the finite dimensions c of the object (see FIG. 3). The intensity distribution I(x) measured by the imaging system is given by:

$$I(x) = [LSF(x) * comb(x/d)].rect(x/c).comb(k\Delta x) \quad (2)$$

Therein, the symbol * denotes the convolution operation. It follows therefrom that:

$$DFT\{I(x)\} = [MTF(f).comb(fd)] * sinc(fc).comb(f_s) \quad (3)$$

Therein, $sinc(x) = sin(x)/x$ and $f_s$ is the sampling frequency.

It appears from the formula (3) that the MTF is the envelope of a number of successive sinc functions (comb(fd),sinc(fc)) which is repeated with the sampling frequency $f_s$. When the slit spacing d is minimized, the dimension of the test object can remain small. As appears from the formula (3) and FIG. 4, the peaks of the MTF are spaced increasingly further apart in the case of a small slit spacing d. An optimum slit spacing d consists of a compromise between the dimension of the test object and the latter effect. It also follows from the formula (3) and FIG. 4 that the dimension c of the test object determines the width of the peaks in the spectrum and must be large enough so as to produce adequate separation of the individual peaks.

The dimension of the pixels Ax in the entrance plane of an image detector can be described as $\Delta x = L/N$ where L is a dimension of the image detector entrance face and N is the number of discrete pixels over dimension L. It follows therefrom that the number of pixels $d_n$ between two slits amounts to $d.N/L$. The number of pixels between two peaks in the spectrum is $N/d_n = L/D$. The number of pixels in the frequency domain below half the sampling frequency amounts to $N/2$. The number of peaks $n_p$ then amounts to $n_p = N.d/2L$. For accurate determination of the MTF a minimum number of four peaks is required. It follows therefrom that $Nd/2L > 4$ or $d > 8 L/N$. it follows from the state of the art that $d < c/2$ must be satisfied in order to obtain a suitable resolution of the peaks in the spectrum, so that:

$$8L/N < d < c/2.$$

If this condition is satisfied, a suitable resolution and a minimum number of peaks are ensured.

The effect of geometrical distortions can be determined by measuring the magnitude of the peaks of the MTF for a varying line spacing in the test object. FIG. 5 shows the calculated magnitude of the MTF value for a frequency equal to one quarter of the sampling frequency with respect to the MTF value for a spatial frequency 0 as a function of the geometrical distortion. Calculations were performed on a test object comprising 5 slits whose spacing linearly increases between the successive slits. $E = (dev/d_{av})*100\%$ is given as a measure of the relative distortion. Therein, $d_{av}$ is the mean slit spacing and dev is the maximum deviation from $d_{av}$. It appears from FIG. 5 that the variation of the MTF value is less than 1% for a distortion amounting to 6%, this is an acceptable result in most cases. Using data as shown in FIG. 5, an estimation of the accuracy of the MTF measurement can be given for a given geometrical distortion.

We claim:

1. A method of determining the modulation transfer function of a digital imaging system comprising:
    spatially line-wise modulating a radiation image through a radiation absorbing plate having substantially parallel equidistant spaced slits to form a modulated image, the slits having a spacing of at least 8 L/N, said modulated image comprising a number of N discrete pixels over a distance L;
    detecting the modulated image over an area having a length dimension L, said detected image manifesting a radiation intensity distribution; and
    converting the intensity distribution of the detected image into electrical signals which are a measure of the radiation intensity distribution of the pixels.

2. The method of claim 1 wherein the modulating a radiation image step includes modulating the image with at least five slits.

3. The method of claim 2 wherein said imaging system comprises an X-ray imaging system, said modulating step including modulating said image through slits having a slit spacing of at least 5 mm.

4. The method of claim 1 wherein the image detecting step tends to distort the modulated image, said method including modulating the radiation image through different slit spacings, determining from the modulated images corresponding to the different slit spacings the value of geometrical distortions for the different slit spacings and deriving from the determined geometric distortions distortion-dependent reliability values for the determined modulation transfer functions, said deriving including calculating the transmission of said different slit spacings.

5. The method of claims 1, 2, 3 or 4 including deriving the modulation transfer function from an envelope of the spectrum determined from said modulated image and determining the envelope by interconnecting discrete points or a gaussian curve.

6. The method of claim 2 wherein the image detecting step tends to distort the modulated image, said method including modulating the radiation image through different slit spacings, determining from the modulated images corresponding to the different slit spacings the value of geometrical distortions for the different slit spacings and deriving from the determined geometric distortions distortion-dependent reliability values for the determined modulation transfer functions, said deriving including calculating the transmission of said different slit spacings.

7. The method of claim 1 wherein said imaging system comprises an X-ray ikmaging system, said modulating step including modulating said image through slits having a slit spacing of at least 5 mm.

8. A test object for use in determining the modulation transfer function of a detected radiation image from incident radiation, said image having a detected length dimension L and N discrete pixels over said length dimension, said object comprising:

a plate of radiation absorbing material having a plurality of slits wherein the slit spacing is at least 8 L/N, said plate being adapted to be positioned in the path of said incident radiation, said plate and slits being so dimensioned so as to produce said image.

9. The object of claim 8 wherein there are at least 5 slits and the spacing is at least 5 mm.

10. The object of claim 9 wherein the plate is an X-ray absorbing material.

* * * * *